G. W. STEINHAUER.
AUTOMOBILE ATTACHMENT.
APPLICATION FILED AUG. 7, 1917.
1,309,491. Patented July 8, 1919.
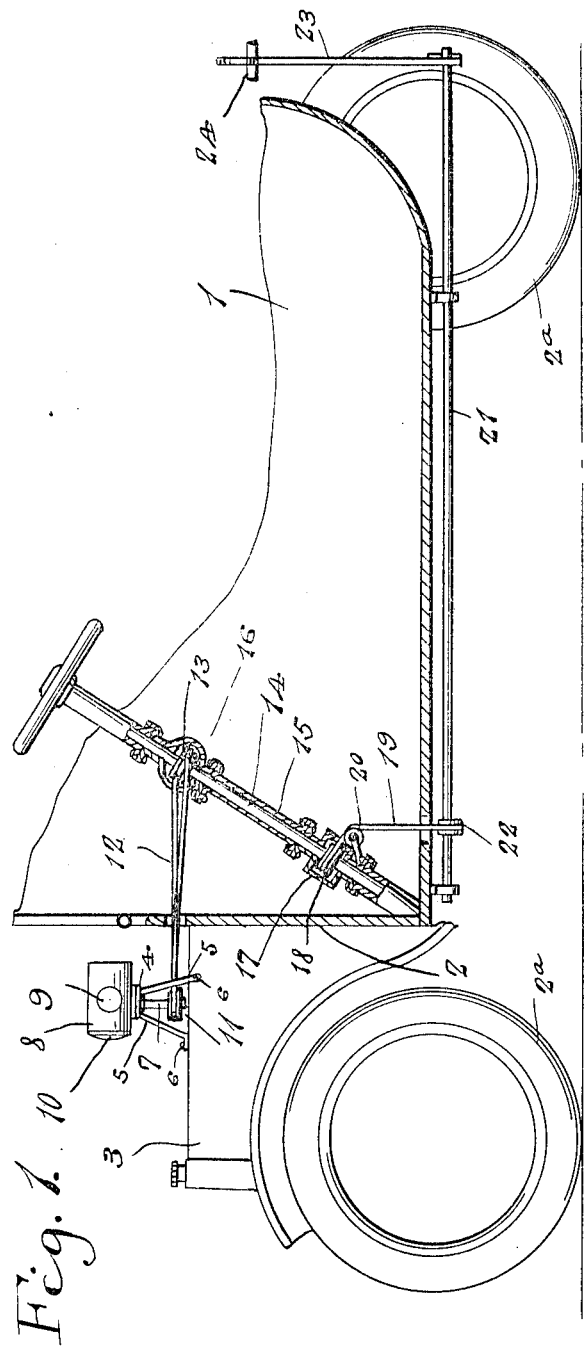
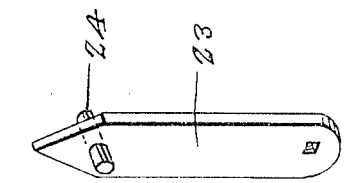
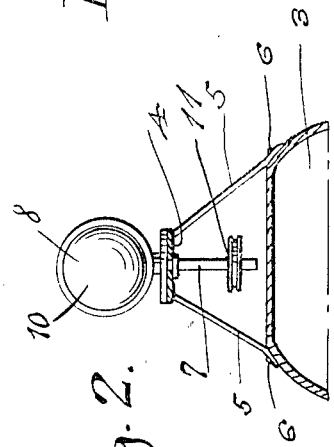
Inventor
G. W. Steinhauer.

UNITED STATES PATENT OFFICE.

GEORGE W. STEINHAUER, OF ROSEBURG, OREGON.

AUTOMOBILE ATTACHMENT.

1,309,491.  Specification of Letters Patent.  Patented July 8, 1919.

Application filed August 7, 1917. Serial No. 184,902.

*To all whom it may concern:*

Be it known that I, GEORGE W. STEIN-HAUER, a citizen of the United States, residing at Roseburg, in the county of Douglas and State of Oregon, have invented certain new and useful Improvements in Automobile Attachments; and I do hereby declare the following to be a full, clear, and exact description of the invention, such as will enable others skilled in the art to which it appertains to make and use the same.

This invention relates to an automobile attachment and has for one of its objects the provision of a device of this character, whereby traffic in front and rear of the respective automobile may be notified in which direction a turn is to be made.

Another object of this invention is the provision of means whereby the path of the vehicle will be illuminated at all times.

A further object of this invention is the provision of an automobile attachment of the above stated character, which shall be simple, durable and efficient, and which may be manufactured and sold at a comparatively low cost.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawing, in which:

Figure 1 is a longitudinal sectional view of an automobile attachment constructed in accordance with my invention, Fig. 2 is a detail sectional view illustrating the means for supporting the signal upon an automobile, Fig. 3 is a perspective view of a rear signal.

Referring to the drawing, the numeral 1 indicates the body of an automobile being mounted upon the usual wheels 2ª. The body 1 has the usual dash 2 connected to the hood 3 that overlies the engine of the automobile. A supporting bracket consisting of a bearing portion 4 has a plurality of downwardly depending legs 5 that are bolted or otherwise secured to the hood as at 6. A lamp standard 7 is journaled in the bearing portion 4 of the bracket and has secured to its upper end, a lamp 8, which is provided with openings in each side thereof for the purpose of permitting light to shine through the sides. The openings are closed by colored plates 9, which may be red, green or any other color suitable for the purpose. The lamp 8 is also provided at its front end with the usual lens 10.

A grooved pulley 11 is secured to the lower end of the lamp standard 7 and has mounted thereon, an endless belt 12. The endless belt 12 passes about a grooved pulley 13 carried by the steering post 14 of the automobile. The steering post is mounted in a housing 15, which is provided with removable sections 16 to permit of the endless belt 12 to be applied to the pulley 13. The housing 15 is also provided with removable sections 17 adjacent its lower end, which surround the pulley 18 that has mounted thereon, an endless belt 19. The endless belt 19 passes over a drive pulley 20 carried by the housing 15 and downwardly through the flooring of the automobile as clearly shown in Fig. 1. A horizontally disposed shaft 21 is journaled to the bottom of the automobile and has secured thereon, a pulley 22 over which the endless belt 19 passes, whereby upon turning the steering post 14, the shaft 21 will be rotated. The shaft 21 extends rearwardly beyond the rear end of the body 1 and has secured thereto, an indicating arrow 23 that normally occupies a vertical position. The arrow is provided with an electric lamp 24, which may be illuminated in any well known manner.

In operation, when turning to the right, the steering post 14 turns the lamp 8 so that the light through the lens 10 will be directed to the right and the opening in one side of the lamp will be disposed in front and to the view of the traffic in front of the respective automobile indicating that a turn is to be made. Upon rotation of the steering post 14, the arrow 23 moves in a corresponding direction to that of the lamp 8 indicating to the traffic in rear of the respective automobile that a turn is to be made.

While I have shown and described the preferred embodiment of my invention, it will be understood that minor changes in construction, combination and arrangement of parts may be made without departing from the spirit and scope of the invention as claimed.

What is claimed is:

An automobile attachment including a steering post and a rotatably mounted headlight having a pulley secured thereto, a housing surrounding the steering post, a removable section to said housing and being of a larger diameter than said housing and having an opening therein, a roller secured to the steering post and located within the removable section, and a belt mounted on the pulley and passing through the opening of the removable section to turn the headlight on turning of the steering post.

In testimony whereof I affix my signature in presence of two witnesses.

GEORGE W. STEINHAUER.

Witnesses:
D. S. HOUSER,
W. T. WRIGHT.